(12) United States Patent
Agarwal et al.

(10) Patent No.: US 12,175,522 B1
(45) Date of Patent: Dec. 24, 2024

(54) DYNAMIC BUCKETIZATION BASED ON REAL-TIME ACCESS PATTERNS

(71) Applicant: Amazon Technologies, Inc., Seattle, WA (US)

(72) Inventors: Anurag Agarwal, Kolkata (IN); Atul Aggarwal, Hyderabad (IN); Punya Murthy Chinta, Redmond, WA (US); Ashish Vashisht, Hyderabad (IN); Chandrashekar Mogilicherla, Hyderabad (IN); Awanish Kumar, Raipur (IN); Prajit Pabbati, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 16/921,794

(22) Filed: Jul. 6, 2020

(51) Int. Cl.
*G06Q 30/00* (2023.01)
*G06Q 30/0601* (2023.01)

(52) U.S. Cl.
CPC ..... *G06Q 30/0641* (2013.01); *G06Q 30/0603* (2013.01); *G06Q 30/0633* (2013.01); *G06Q 30/0639* (2013.01)

(58) Field of Classification Search
CPC . G06Q 30/00; G06Q 30/0601; G06Q 30/0631
See application file for complete search history.

(56) References Cited

U.S. PATENT DOCUMENTS

| 8,108,431 | B1 | | 1/2012 | Guner et al. |
| 8,290,818 | B1 | * | 10/2012 | Levitan ............... G06Q 30/0631 |
| | | | | 705/26.7 |
| 9,389,965 | B1 | * | 7/2016 | Douglis ............... G06F 12/121 |
| 9,589,065 | B2 | | 3/2017 | Bhagwan et al. |
| 10,127,600 | B2 | | 11/2018 | Kumar et al. |
| 10,169,463 | B2 | | 1/2019 | Bhagwan et al. |
| 10,354,314 | B1 | | 7/2019 | Sarma |
| 10,497,046 | B2 | | 12/2019 | Dabral et al. |
| 10,503,423 | B1 | * | 12/2019 | Douglis ............... G06F 12/121 |
| 10,504,163 | B2 | | 12/2019 | Dogin et al. |
| 10,504,193 | B2 | | 12/2019 | Isaacson et al. |
| 10,586,269 | B2 | | 3/2020 | Kumar et al. |

(Continued)

OTHER PUBLICATIONS

Rozen, T., Krzysztof Boryczko, and Witold Alda. "GPU bucket sort algorithm with applications to nearest-neighbour search." (2008). (Year: 2008).*

(Continued)

*Primary Examiner* — Christopher B Seibert
(74) *Attorney, Agent, or Firm* — Robert C. Kowert; Kowert, Hood, Munyon, Rankin & Goetzel, P.C.

(57) ABSTRACT

Methods, systems, and computer-readable media for dynamic bucketization based on real-time access patterns are disclosed. Item identifiers corresponding to items in a data store are distributed among of buckets based at least in part on one or more bucket parameters. The item identifiers are divided into access windows within the buckets. Items corresponding to item identifiers in one or more access windows are loaded from the data store. Based at least in part on one or more access requests from a client with respect to the loaded items, one or more item identifiers are moved between access windows. The updated access windows with different sets of items are stored back to the data store.

20 Claims, 12 Drawing Sheets

(56) References Cited

U.S. PATENT DOCUMENTS

| | | | |
|---|---|---|---|
| 11,019,169 B2* | 5/2021 | Busayarat | H04N 21/4821 |
| 2008/0243637 A1* | 10/2008 | Chan | G06Q 30/02 |
| | | | 705/26.1 |
| 2009/0019053 A1* | 1/2009 | Burgess | G06Q 30/02 |
| 2009/0259561 A1* | 10/2009 | Boys | G06Q 30/0601 |
| | | | 705/26.1 |
| 2011/0184831 A1* | 7/2011 | Dalgleish | G06Q 30/0631 |
| | | | 705/26.7 |
| 2011/0191311 A1* | 8/2011 | Polonsky | G06F 16/335 |
| | | | 707/706 |
| 2011/0191374 A1* | 8/2011 | Bengio | G06F 16/53 |
| | | | 707/E17.014 |
| 2014/0032484 A1* | 1/2014 | Cameron | G06F 16/972 |
| | | | 707/607 |
| 2014/0344102 A1* | 11/2014 | Cooper | G06Q 30/0631 |
| | | | 705/26.7 |
| 2015/0058593 A1* | 2/2015 | King | G06F 12/1081 |
| | | | 711/206 |
| 2015/0149870 A1* | 5/2015 | Kozat | H04L 1/0048 |
| | | | 714/772 |
| 2015/0170250 A1* | 6/2015 | Dalal | G06Q 30/0623 |
| | | | 705/26.7 |
| 2018/0004758 A1* | 1/2018 | Lewis | G06F 16/24578 |
| 2023/0306029 A1* | 9/2023 | Su | H04L 67/02 |

OTHER PUBLICATIONS

Welicki, Leon. "Patterns for Factoring Responsibilities when Working with Objects and Relational Databases." EuroPLoP. 2007. ( Year: 2007).*

* cited by examiner

| Bucket-Specific Manifest 125A | | | | |
|---|---|---|---|---|
| Item IDs | Product IDs | Date | ••• | Storage Key |
| Item 1 | | | | Storage Key 151 |
| ⋮ | | | | Storage Key 151 |
| Item 10 | | | | Storage Key 151 |
| Item 11 | | | | Storage Key 152 |
| ⋮ | | | | Storage Key 152 |
| Item 20 | | | | Storage Key 152 |
| Item 21 | | | | Storage Key 153 |
| ⋮ | | | | Storage Key 153 |
| Item 30 | | | | Storage Key 153 |
| Item 31 | | | | Storage Key 154 |
| ⋮ | | | | Storage Key 154 |
| Item 38 | | | | Storage Key 154 |

FIG. 5

DYNAMIC BUCKETIZATION BASED ON REAL-TIME ACCESS PATTERNS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogues of items offered for sale. For each item, such electronic catalogues typically include at least one product detail page that specifies various information about the item, such as a description of the item, one or more pictures of the item, as well as specifications (e.g., weight, dimensions, capabilities) of the item. In various cases, such stores may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

BRIEF DESCRIPTION OF THE DRAWINGS

FIG. 5 illustrates further aspects of the example system environment for dynamic bucketization based on real-time access patterns, including an example of a bucket-specific manifest comprising a sorted list of items divided into a plurality of access windows, according to some embodiments.

Figure 1:
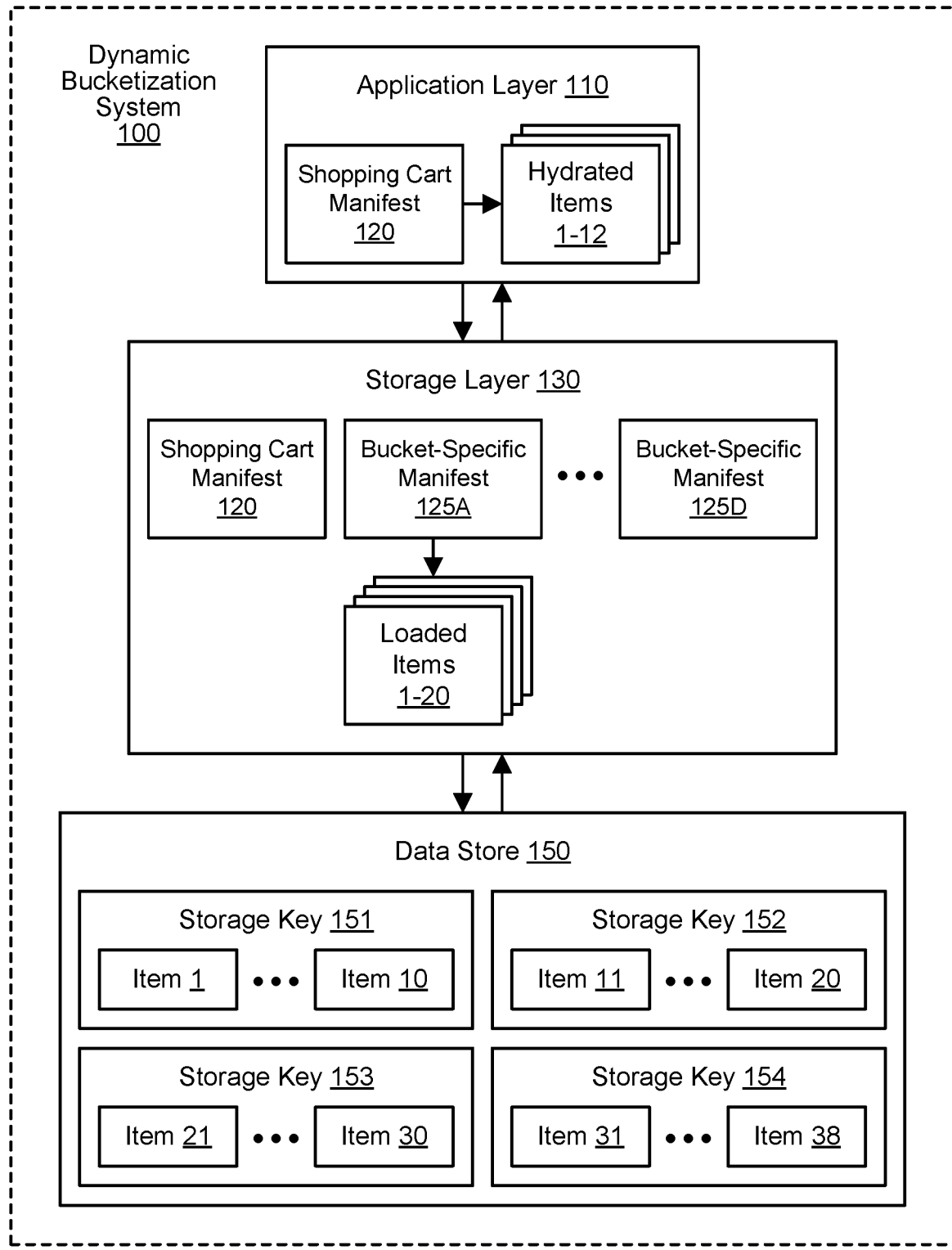
FIG. 1 illustrates an example system environment for dynamic bucketization based on real-time access patterns, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for item bucketization based on real-time access patterns are described. An Internet-accessible electronic catalogue may offer millions of different items for sale or lease. To facilitate large orders (having many different items) or large shopping lists (having many different items), a shopping cart for the electronic catalogue may enable customers to list an indefinitely large number of items from one or more vendors. Information descriptive of items in a shopping cart, shopping list, wish list, or other list of items may be stored in an underlying data store and loaded into a user interface at an appropriate point in time, e.g., when a customer seeks to view her or his cart via a web page or mobile app. For example, a line item in a shopping cart or other list may be associated with a product identifier, a price, a quantity, shipping information, payment information, gift options, and so on. This process of loading this item data (e.g., to a user interface or application layer) may be referred to as hydration. For a particularly large list of items, hydrating the entire list at once may be burdensome on computing resources (e.g., network and database resources) and may be slow enough to have a negative impact on the user experience.

Various approaches have been taken to organize the item data in the underlying storage. In some prior approaches, each item was stored separately in a data store, e.g., using a distinct record. To query for items in such a system, a scan query can be made using a pagination pointer. For example, a customer's cart can be expressed by a single partition key per customer and a sort key (e.g., incremental counter or date timestamp) per item. Queries can be made on sort keys to get paginated results. However, such an approach may use static sorting such that if ordering by a different parameter is desired, the counter of the sort key may need to be recomputed for every cart. Additionally, such extreme fragmentation in the underlying storage could lead to a high read throughput as well as an undesirable space utilization. In other prior approaches, all the items were stored in the same "blob" of storage, and the entire blob was fetched from the storage before extracting the desired items from the blob. Such an approach could use excessive throughput due to the retrieval of so much unnecessary item data.

The aforementioned challenges, among others, are addressed by embodiments of the techniques described herein, whereby items may be assigned to buckets and divided into access windows within those buckets, and items in one or more access windows may be selectively hydrated (while items in other access windows are not hydrated) to conserve use of resources (e.g., network and database resources). A dynamic hydration system may strike a balance between the extreme fragmentation approaches (one item per record) and the blob approaches (all items in one record) described above. Items that are often accessed together may be stored together in the underlying storage and hydrated together, to the exclusion of other items that are not often accessed together. Items may be initially bucketized using a static configuration that reflects observed real-world access patterns. For example, items in a customer's cart that are ready to be purchased may be assigned to an "active" bucket, while items that are saved in a cart or list for later purchase may be assigned to an "inactive" bucket. Within a bucket, items may be sorted according to sort criteria (e.g., a timestamp of the item's addition to the list) and divided into access windows (individual windows not exceeding a maximum item count) so that items that are often accessed together are also stored together (e.g., in the same page or other record). When one item in an access window is requested to be loaded, all the items in the access window may be loaded to a storage layer, and the requested items (a subset of the loaded items at the storage layer) may then be provided to an application layer for hydration. The distribution of items among buckets and/or access windows can be altered dynamically at run-time based on real-time client access requests. By grouping and regrouping items according to access patterns, the dynamic hydration system may minimize fragmentation in the storage (e.g., as experienced when storing each item separately) while also reducing network throughput (e.g., as experienced when storing all items in a single blob).

As one skilled in the art will appreciate in light of this disclosure, embodiments may be capable of achieving certain technical advantages, including some or all of the following: (1) reducing the use of storage resources for storing item data by not storing each item in a cart or list as a separate record having a minimum storage footprint; (2) reducing the use of network resources for retrieving item data by not storing all items in a cart or list in the same storage blob such that the entire blob must be loaded to obtain one item; (3) improving the latency of hydration by organizing storage such that items that are often accessed together are stored together and hydrated together; (4) improving availability by not storing all items in a cart or list in the same storage blob such that the entire blob must be loaded to obtain one item; and so on.

FIG. 1 illustrates an example system environment for dynamic bucketization based on real-time access patterns, according to some embodiments. A dynamic hydration system 100 may manage lists of items for various users such that data describing some items in the list may be selectively and simultaneously retrieved from a data store 150 and hydrated at an application layer 110 while data describing other items in the list may not be simultaneously retrieved. The lists may include lists of items in a shopping cart or wish list for customers of an Internet-accessible electronic catalogue that offers millions of different items for sale, lease, rental, or other transactions. Information descriptive of items in a list may be stored in the underlying data store 150 and loaded by a storage layer 130 into the application layer 110 at an appropriate point in time. For example, a subset of items in a list may be loaded into an application layer for display via a user interface when a customer asks to view her or his cart via a web page or mobile app. A line item in a shopping cart or other list may be associated with a product identifier, a price, a quantity, shipping information, payment information, gift options, and so on. This process of loading this item data (e.g., to a user interface or application layer) may be referred to as hydration.

In some embodiments, to facilitate large orders (having many different items) or large shopping lists (having many different items), the dynamic hydration system 100 may support lists of indefinitely large numbers of items. For a particular customer, one or more lists may represent active items in a shopping cart, items that have been saved for later in a shopping cart, items in a wish list, and so on. A list may be keyed by a unique customer identifier in the data store. In some embodiments, multiple lists may be stored for a particular customer.

The dynamic hydration system 100 may achieve a balance between an extreme fragmentation approach (one item per record) and a blob approach (all items in one record). By grouping and regrouping items according to access patterns, the dynamic hydration system may minimize fragmentation in the storage (e.g., as experienced when storing each item separately) while also reducing network throughput (e.g., as experienced when storing all items in a single blob). Items that are often accessed together may be stored together in the underlying storage 150 and hydrated together by the storage layer 130, to the exclusion of other items that are not often accessed together. Items may be initially bucketized using a static configuration that reflects observed real-world access patterns. For example, items in a customer's cart that are ready to be purchased may be assigned to an "active" bucket, while items that are saved in a cart or list for later purchase may be assigned to an "inactive" bucket. Items may be bucketized according to one or more bucket parameters or item-specific parameters, e.g., active or inactive, gift or non-gift, and so on. In some embodiments, items may be dynamically rearranged within the same buckets or different buckets based (at least in part) on one or more runtime changes to the bucket parameters or the bucketizing approach.

A bucket may be associated with one or more access window parameters such as a number of items that are typically accessed together (e.g., a window size of ten) and one or more sorting criteria (e.g., the times at which items were added to the list). Within a bucket, items may be sorted according to the sort criteria and divided into access windows according to the window size. An access window may represent a set of items that are stored together and loaded together (e.g., in the same page or other record in the data store). In some embodiments, when one item in an access window is requested to be loaded, all the items in the access window may be loaded to the storage layer 130. The requested items (e.g., a subset of the loaded items at the storage layer 130) may then be provided to the application layer 119 for hydration. The access window parameters may be determined initially based (at least in part) on a static configuration. In some embodiments, the items may be dynamically rearranged within the same access windows or different access windows based (at least in part) on one or more runtime changes to the access window parameters or modifications to the items themselves.

A sorted list of items within a bucket may be divided into access windows according to a pagination value that represents a maximum size (in number of items) of an access window. An access window may not exceed the pagination value, but an access window may have fewer items than the pagination value. For example, the first N access windows for a bucket may each have the maximum number of items, but the final access window may have fewer items. As another example, if items are deleted from one access window, items may be moved to that window from the next access window, thus leaving the next access window with fewer items than the maximum value. In some embodiments, the maximum size of an access window may be determined using a page size or record size in the data store so that each access window fits within one page or record.

In some embodiments, when a list is first requested (e.g., by the application layer 110) to be loaded, a manifest 120 may be acquired by the storage layer 130 and bucketized. The manifest 120 may include a mapping between unique entity keys (e.g., item identifiers for line items in a list) and the locations of data for those keys (e.g., a location in the data store for item data such as item-specific product identifiers, prices, quantities, shipping information, payment information, gift options, and so on). The manifest 120 may represent a list of items in a shopping cart for a particular user of an Internet-accessible catalogue. The bucketization may be performed according to a static configuration such that items that are commonly accessed together tend to be assigned to the same bucket. The storage layer 130 may generate bucket-specific manifests that reflect the distribution of items among the various buckets. For example, if items are assigned to four different buckets, then the storage layer 130 may create bucket-specific manifests 125A through 125D. A bucket-specific manifest may include a mapping between unique entity keys (e.g., item identifiers for line items in a list) and the locations of data for those keys (e.g., a location in the data store for item data such as item-specific product identifiers, prices, quantities, shipping information, payment information, gift options, and so on) for the particular items that were assigned to that bucket.

In some embodiments, one or more buckets may be divided into access window groups based (at least in part) on values specified with the load request, e.g., filter, sorting, and pagination values. For example, the items in the first bucket (corresponding to bucket-specific manifest 125A may be divided into four or more access windows, with item 1 through item 10 in the first access window, item 11 through item 20 in the second access window, item 21 through item 30 in the third access window, and item 31 through item 38 in the fourth access window. In the example shown in FIG. 1, the division of items into the access windows may be performed according to an access window size of 10. In addition to the depicted access windows, the access windows for the bucket may include one or more additional windows of 10 or fewer items each. An access window may represent a set of items that are stored together and loaded together (e.g., in the same page or other record in the data store). In some embodiments, when one item in an access window is requested to be loaded by the application layer 110, all the items in the access window may be loaded from the data store 150 by the storage layer 130. In some embodiments, when one item in an access window is requested to be modified by the application layer 110, all the items in the access window may be stored back to the data store 150 by the storage layer 130.

In some embodiments, the maximum size of an access window (e.g., 10 items) may be determined using a page size or record size in the data store 150 so that each access window fits within one page or record. As shown in the example of FIG. 1, items 1-10 of the first access window may be stored using one page or record identified by storage key 151, items 11-20 of the second access window may be stored using one page or record identified by storage key 152, items 21-30 of the third access window may be stored using one page or record identified by storage key 153, and items 31-38 of the fourth access window may be stored using one page or record identified by storage key 154. Stored items 1-38 may include item-specific data such as product identifiers, prices, quantities, shipping information, payment information, gift options, and so on.

In the example of FIG. 1, once the global manifest 120 has been retrieved from the data store 150 by the storage layer 130 and provided to the application layer 110, the application layer may request information for a set of item identifiers corresponding to item 1 through item 12 (i.e., the first twelve items in the first bucket) as listed in the manifest. In some embodiments, a client of the application layer 110 may request items 1-10, and the application layer 110 may add a buffer value (e.g., 2) to the requested value. In various embodiments, clients of the application layer 110 may include other components or services of an Internet-accessible electronic catalogue or end users (customers). In some embodiments, the application layer 110 may add a buffer value (e.g., 2) to an initial value (e.g., 10) determined according to a static configuration that reflects observed access patterns. The storage layer 130 may receive the request for items 1-12 and may determine that the requested items are spread across two storage keys 151 and 152. The storage layer 130 may retrieve all the items 1-10 for the first storage key 151 (corresponding to the first access window) and also all the items 11-20 for the second storage key 152 (corresponding to the second access window). The loaded items 1-20 may include item-specific data such as product identifiers, prices, quantities, shipping information, payment information, gift options, and so on.

From the loaded items 1-20, the storage layer 130 may provide the requested items 1-12 to the application layer 110. The items 1-12 may represent hydrated items at the application layer 110 and may be used by the application layer to display or present information about one or more of the hydrated items. The hydrated items 1-12 may include item-specific data such as product identifiers, prices, quantities, shipping information, payment information, gift options, and so on. In some embodiments, the application layer 110 may display or present information about items 1-10 but not necessarily the additional items that were hydrated due to addition of the buffer value (e.g., 2). However, the application layer 110 may potentially display or present information about the additional items, e.g., if other items are moved to a different list or deleted.

The dynamic hydration system 100 may alter the distribution of items among buckets and/or access windows dynamically at run-time based on actual client access requests. Access requests may include requests (e.g., from a customer computing device to the application layer 110) to modify data for items (e.g., changing quantities or gift options), delete items from a list, add items to a list, reorganize items within a list, view items in a user interface, and so on. The internal storage of items may be adjusted according to an interface-level grouping of items, sorting criteria, and/or pagination criteria desired by customers. For example, if clients begin to fetch the top twenty items from a list instead of the top ten items, then the dynamic hydration system 100 may begin fetching items from an additional access window in addition to items that are specifically requested by the client. The proactive fetching of additional items based (at least in part) on observed access patterns may prevent the application layer from needing to send another request for items and may thus improve the user experience. As another example, if customers begin to fetch gift items separately from non-gift items, items may be regrouped into different buckets representing gift items and non-gift items so that the different categories of items can be hydrated independently of one another. As yet another example, if items are deleted from a cart or list or if items are reordered within a cart or list, items may be redistributed among access windows so that that related items are hydrated together using access windows of an appropriate size. By redistributing items in this manner (e.g., moving one or more items from one access window to a neighboring access window), the dynamic hydration system 100 may prevent a fragmentation of items into increasingly smaller access windows that may use excessive storage resources.

In some embodiments, the dynamic hydration system 100 may be implemented within a service-oriented system comprising a plurality of services. The services may include services corresponding to the application layer 110, the storage layer 130, the data store 150, and so on. Each service may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service. A service may offer one or more application programming interfaces (APIs) or other programmatic interfaces through which another service may request the functionality of the service. The service-oriented system may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, the computing resources for one or more services (potentially including aspects of the dynamic hydration system 100) may be automatically allocated from a pool of computing resources. The pool of computing resources may be managed by a resource manager associated with the service-oriented system. The pool may represent a plurality of computing resources which are available to various services in a service-oriented system, including the particular service. The pool may include a plurality of computing resources such as virtual compute instances that may be heterogeneous or homogeneous in their hardware capabilities and software configuration. The computing resources in the pool may be usable to provide or otherwise implement one or more services.

In one embodiment, the resource manager may manage a multi-tenant, cloud-based provider network that includes the computing resources used for scaling of services. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources.

Figure 8:
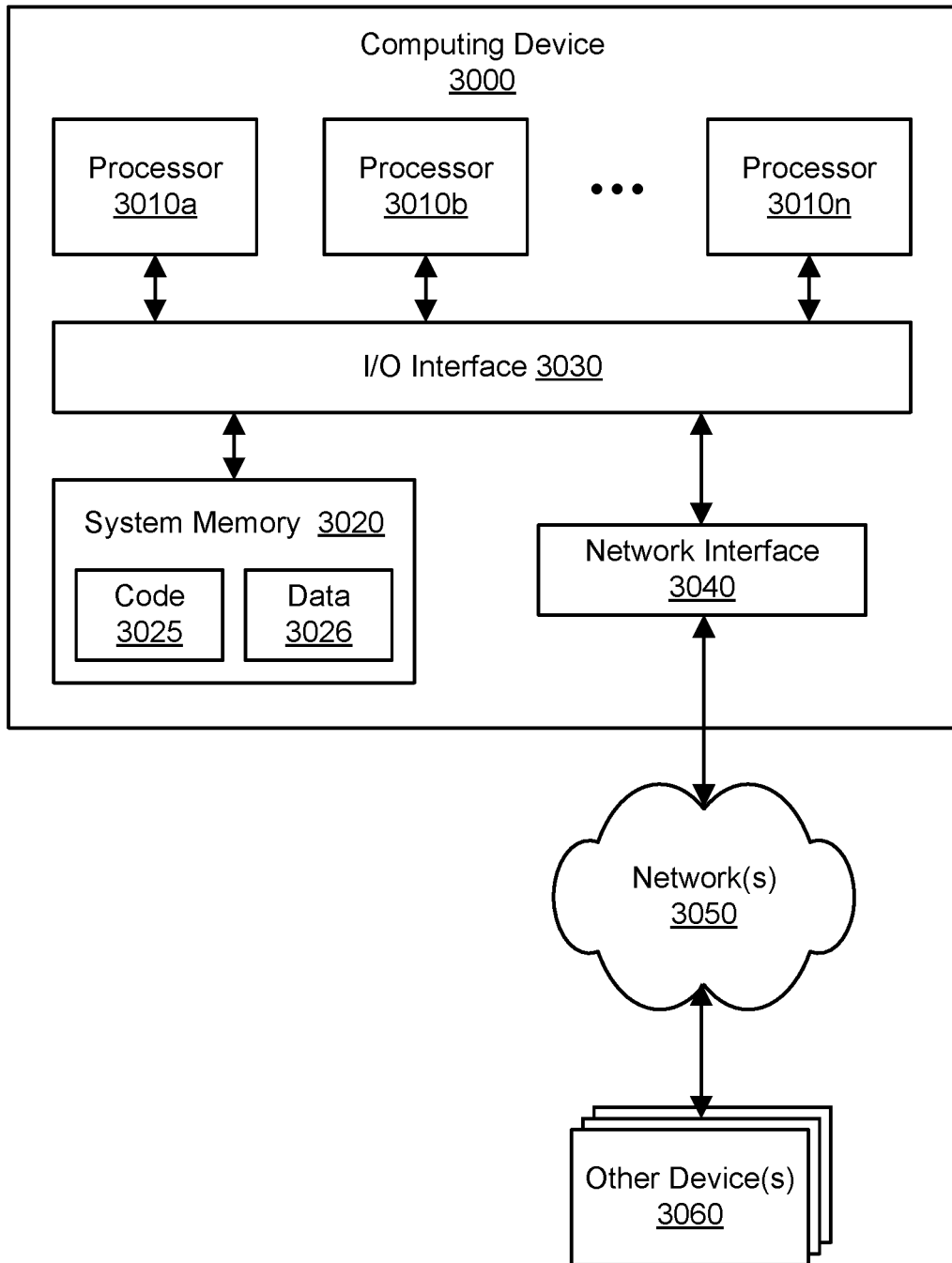
FIG. 8 illustrates an example of a computing device that may be used in some embodiments.

The dynamic hydration system 100 may include one or more computing devices, any of which may be implemented by the example computing device 3000 illustrated in FIG. 8. In various embodiments, the functionality of the different services, components, and/or modules of the dynamic hydration system 100 may be provided by the same computing device or by different computing devices. If any of the various components of the dynamic hydration system 100 are implemented using different computing devices, then the respective computing devices may be communicatively coupled, e.g., via a network. In one embodiment, aspects of dynamic hydration system 100 may be performed automatically and/or programmatically, e.g., by executing program instructions without direct user intervention.

Figure 2:
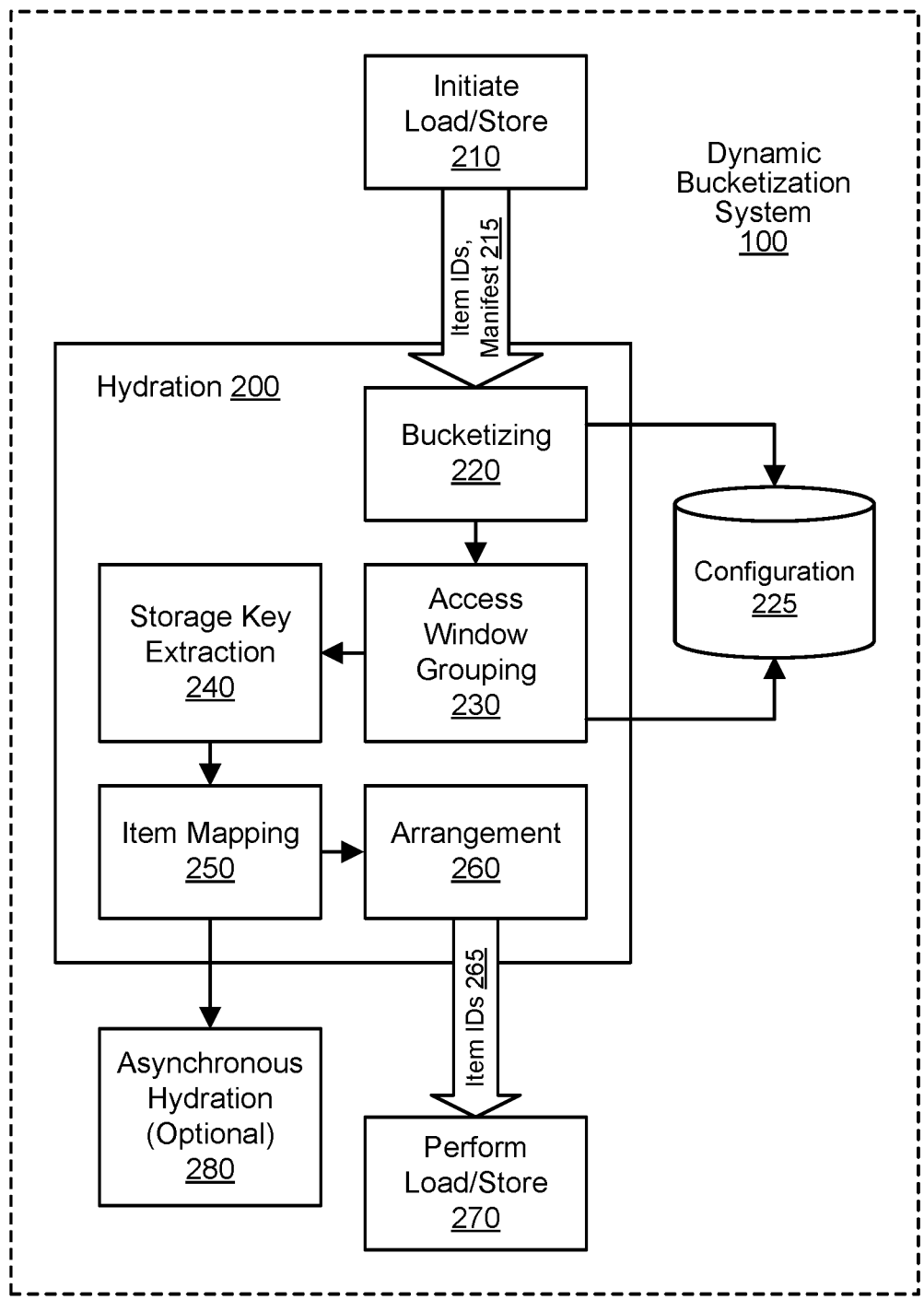
FIG. 2 illustrates further aspects of the example system environment for dynamic bucketization based on real-time access patterns, including an example of a hydration module and its components, according to some embodiments.

FIG. 2 illustrates further aspects of the example system environment for dynamic bucketization based on real-time access patterns, including an example of a hydration module and its components, according to some embodiments. A hydration module 200 may perform aspects of the selective hydration described herein. A load or store request may be received for a particular user identifier to initiate a load or store operation 210. The load/store 210 may load the manifest for the user ID and derive the list of item identifiers to be loaded from storage or stored back to storage. The one or more item identifiers and manifest identifier 215 may be provided to the hydration module 200. After receiving the identifiers 215, the hydration module 200 may perform bucketizing 220. The bucketizing 220 may create buckets based (at least in part) on one or more bucket parameters, as discussed above. The hydration module 200 may perform access window grouping 230 to generate access windows for one or more buckets based (at least in part) on one or more access window parameters, as discussed above. The bucketizing 220 and access window grouping 230 may modify a configuration 225 of the item data associated with the manifest, e.g., in the data store 150.

The hydration module 200 may perform storage key extraction 240 to extract the storage keys to be loaded based (at least in part) on the access windows that contain at least one item present in the input list of item identifiers. The storage key extraction 240 may enable the hydration module 200 to optimize by loading all items present in a page referenced by a key. For example, if two different access windows point to the same storage key and the request requires loading only a single access window, the hydration 200 may optimize by internally loading both of the windows without expending extra resources. The hydration module 200 may perform item mapping 250 to map the storage keys to the list of item identifiers to be loaded. The hydration module 200 may perform arrangement logic 260 to re-order the item identifiers based (at least in part) on any requirements. For example, the item IDs may be rearranged to keep items in the same access window together. As another example, if an item is added to a cart, the arrangement 260 may keep the added item as the last item so that it does not cause unnecessary fragmentation. The hydration module 200 may provide a final list of item IDs 265 for the actual load or store operation 270.

The system 100 may optionally perform asynchronous hydration 280 to start the hydration process for items belonging to the same access window but in multiple keys. In such a scenario, the hydration module 200 may submit a request to a queue from which asynchronous hydration can be performed, e.g., if the parameters for hydration are changed. In some embodiments, an on-demand query may provide querying capability on the entire data schema to supporting use cases like compliance (e.g., tax audits), operations (e.g., near real-time queries for pricing errors), ad-hoc queries (e.g., backfilling indexes for older purchases), and so on. The engine may use data/event log stores for time-based indexing and loading of purchase documents.

In some embodiments, forced hydration may be performed. If it is observed, during load, that items in same access window are being loaded from multiple pages (beyond some threshold), then forced hydration may be invoked in an asynchronous manner to hydrate the items together in single page. The set of items may be stored back to the data store as a single access window in the single page. In some embodiments, automatic adjustment may be performed. If the static configuration like bucket or access window parameters are changed, the algorithm may auto- adjust and start storing items with the new configuration. For example, if the access window size is decreased or increased, items may be automatically loaded/stored according to the new parameters. For some changes, like bucket parameters, the entire order of items can change and performance gaps may be seen while transitioning from old parameters to new ones. In some embodiments, auto-hydration may be performed. It may happen that the distribution of items in storage pages will not always be as per the access windows. For example, if the first 50 active items are loaded and one of them gets deleted, then the first page will be left with only 49 items. In such a scenario, the next call to load 50 items may need 49 items from a single page and one other item from a different page. However, because all 50 items belong to same access window, on any modification in further calls, all 50 items may again get rehydrated. In some embodiments, the system 100 may automatically re-adjust to hydrate items belonging to same access window together.

Figure 3A:
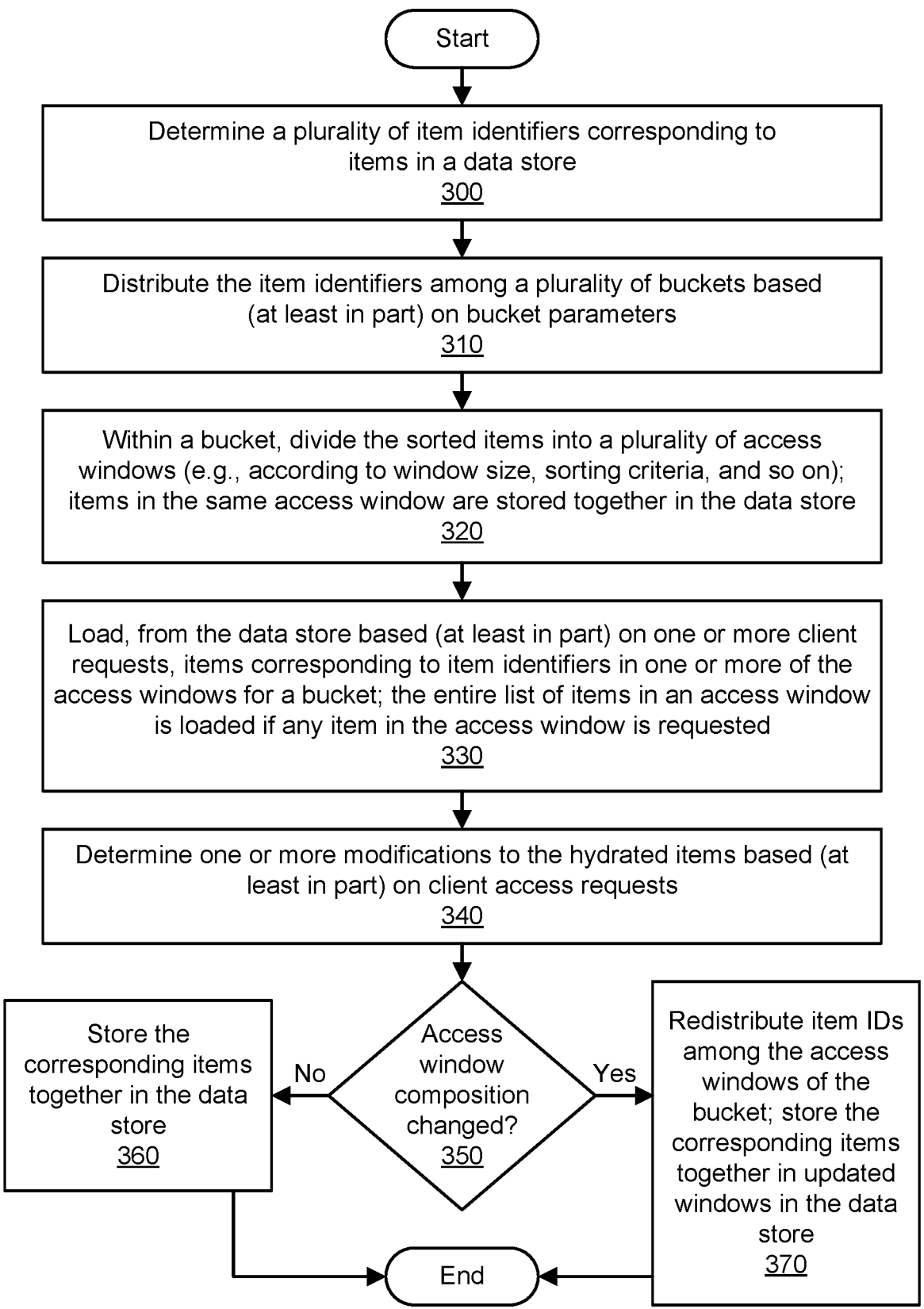
FIG. 3A and FIG. 3B are flowcharts illustrating methods for dynamic bucketization based on real-time access patterns, according to some embodiments.

FIG. 3A is a flowchart illustrating a method for dynamic bucketization based on real-time access patterns, according to some embodiments. As shown in 300, a plurality of item identifiers (IDs) may be determined. The item IDs may correspond to descriptive information about items in a data store. Information descriptive of items in a shopping cart or other list may be stored in the underlying data store and loaded by a storage layer into an application layer at an appropriate point in time. For example, a subset of items in a list may be loaded into an application layer for display via a user interface when a customer asks to view her or his cart via a web page or mobile app. A line item in a shopping cart or other list may be associated with a product identifier, a price, a quantity, shipping information, payment information, gift options, and so on.

As shown in 310, the item identifiers may be distributed among a plurality of buckets based (at least in part) on one or more item parameters or bucket parameters. The items may be sorted within each bucket according to sorting criteria. Items may be initially bucketized using a static configuration that reflects observed real-world access patterns. For example, items in a customer's cart that are ready to be purchased may be assigned to an "active" bucket, while items that are saved in a cart or list for later purchase may be assigned to an "inactive" bucket. Items may be bucketized according to one or more bucket parameters or item-specific parameters, e.g., active or inactive, gift or non-gift, and so on. In some embodiments, items may be dynamically rearranged within the same buckets or different buckets based (at least in part) on one or more runtime changes to the bucket parameters or the bucketizing approach. In some embodiments, when a list is first requested (e.g., by the application layer) to be loaded, a manifest may be acquired by the storage layer and bucketized. The manifest may include a mapping between unique entity keys (e.g., item identifiers for line items in a list) and the locations of data for those keys (e.g., a location in the data store for item data such as item-specific product identifiers, prices, quantities, shipping information, payment information, gift options, and so on). The manifest may represent a list of items in a shopping cart for a particular user of an Internet-accessible catalogue. The method may generate bucket-specific manifests that reflect the distribution of items among the various buckets.

As shown in 320, within a given bucket, the sorted items may be divided into a plurality of access windows. Items in the same access window may be stored together in the data store. A bucket and its access windows may be associated with one or more access window parameters such as a number of items that are typically accessed together (e.g., a window size of ten) and one or more sorting criteria (e.g., the times at which items were added to the list). The access window parameters may be determined initially based (at least in part) on a static configuration. In some embodiments, the items may be dynamically rearranged within the same access windows or different access windows based (at least in part) on one or more runtime changes to the access window parameters or modifications to the items themselves.

As shown in 330, descriptive information about items may be loaded from the data store based (at least in part) on one or more client requests. The information may include item-specific data such as product identifiers, prices, quantities, shipping information, payment information, gift options, and so on. The loaded items may correspond to item IDs in one or more of the access windows for a particular bucket. The entire list of items in an access window may be loaded if any item in the access window is requested. From the loaded items, the storage layer may provide the requested items to the application layer. These items may be referred to as hydrated items.

As shown in 340, one or more modifications may be determined for the hydrated items based (at least in part) on one or more client access requests. Access requests may include requests (e.g., from a customer computing device to the application layer) to modify data for items (e.g., changing quantities or gift options), delete items from a list, add items to a list, reorganize items within a list, load the items from the data store, and so on. As shown in 350, the method may determine whether the composition of any access windows has changed due to the modification(s). For example, if one or more items were deleted from an access window or added to an access window, the composition may be deemed different than before the modification. If not, then as shown in 360, the items corresponding to the item IDs in the affected access window(s) may be stored back to the data store. All the items for an access window in which any item was modified may be stored back.

If the composition was changed, then as shown in 370, one or more item IDs may be redistributed among the access windows or storage keys for the bucket. Redistribution of item IDs may include moving one or more item IDs from one access window or storage key to another, e.g., to maintain a page size for at least some of the access windows or storage keys. Redistribution of item IDs may include combining two or more access windows into a single access window. Redistribution of item IDs may include dividing one access window into two or more access windows. The items corresponding to the item IDs in the affected access window(s) may be stored back to the data store. All the items for an access window in which any item was modified may be stored back.

Figure 3B:
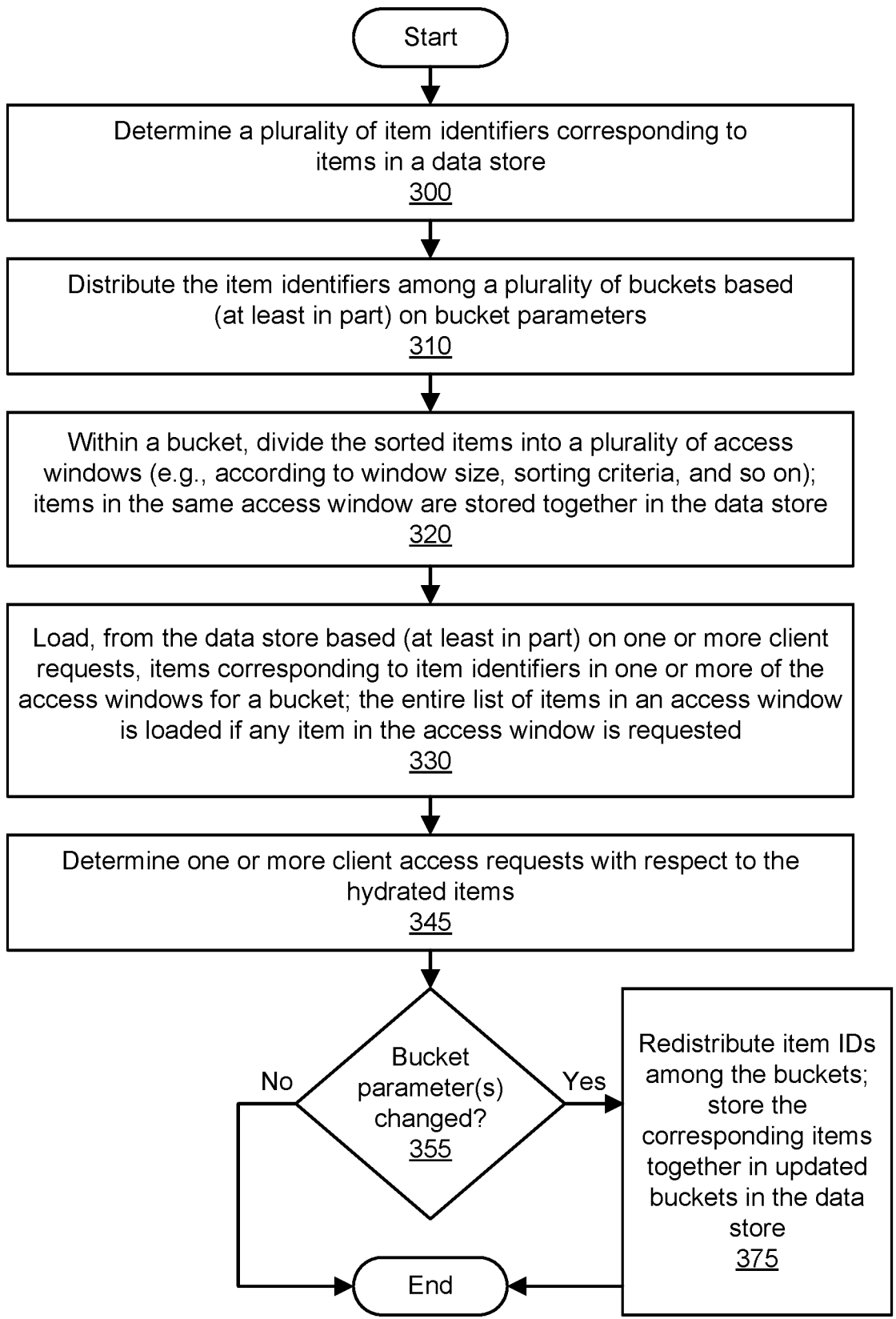

FIG. 3B is a flowchart illustrating a method for dynamic bucketization based on real-time access patterns, according to some embodiments. As shown in 300, a plurality of item identifiers (IDs) may be determined. As shown in 310, the item identifiers may be distributed among a plurality of buckets based (at least in part) on one or more item parameters or bucket parameters. As shown in 320, within a given bucket, the sorted items may be divided into a plurality of access windows. As shown in 330, descriptive information about items may be loaded from the data store based (at least in part) on one or more client requests.

As shown in 345, one or more client access requests may be determined with respect to the hydrated items. Access requests may include requests (e.g., from a customer computing device to the application layer) to modify data for items (e.g., changing quantities or gift options), delete items from a list, add items to a list, reorganize items within a list, load the items from the data store, and so on. In some embodiments, automatic adjustment may be performed. If the static configuration like bucket or access window parameters are changed, the algorithm may auto-adjust and start storing items with the new configuration. For example, if a bucket parameter changes, then the bucketization may change as well. As shown in 355, the method may determine whether any of the bucket parameters have changed, e.g., due to the client access requests. For example, a change to a bucket parameter may be observed if a client begins grouping gift items and non-gift items together after previously grouping them separately, or if a client begins grouping active items and saved-for-later items together after previously grouping them separately. As another example, a change to a bucket parameter may be observed if a client explicitly requests a change to the parameter.

If a change to a bucket parameter is determined, then as shown in 375, items may be rebucketized according to the modified bucket parameter(s). Rebucketizing the items may include redistributing one or more item IDs from one bucket to another bucket. Rebucketizing the items may include combining two or more buckets into a single bucket. Rebucketizing the items may include dividing one bucket into two or more buckets. The items corresponding to the item IDs in the affected access window(s) and/or affected bucket(s) may be stored back to the data store. All the items for an access window in which any item was modified may be stored back.

Figure 4A:
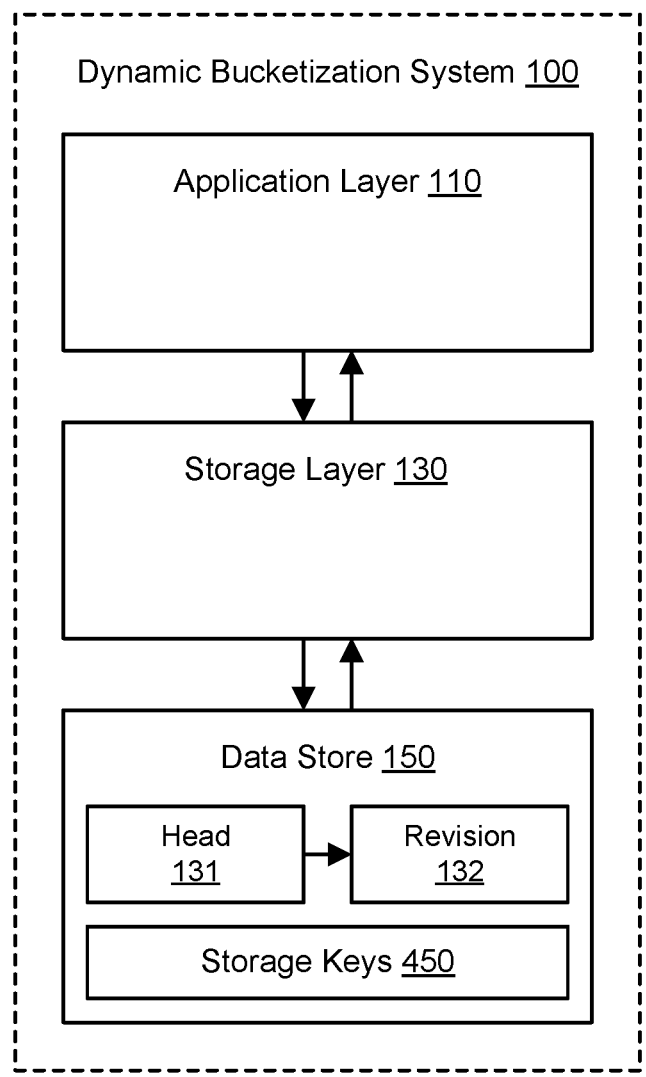
FIG. 4A, FIG. 4B, FIG. 4C, and FIG. 4D illustrate further aspects of the example system environment for dynamic bucketization based on real-time access patterns, including an example of loading a list of items to an application layer, according to some embodiments.
Figure 4B:
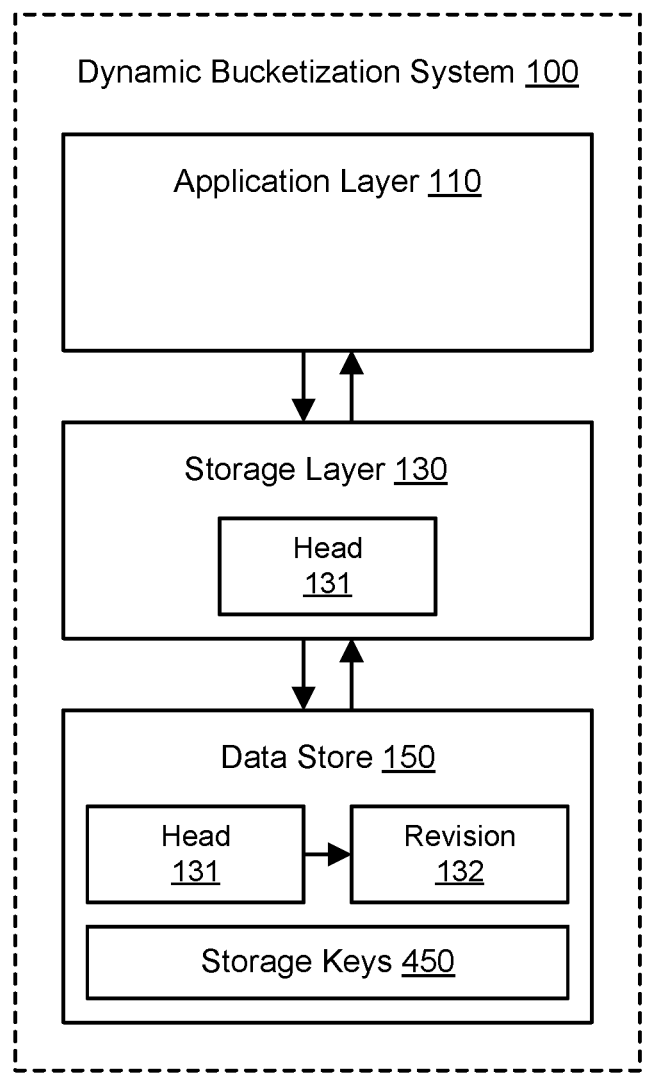
Figure 4C:
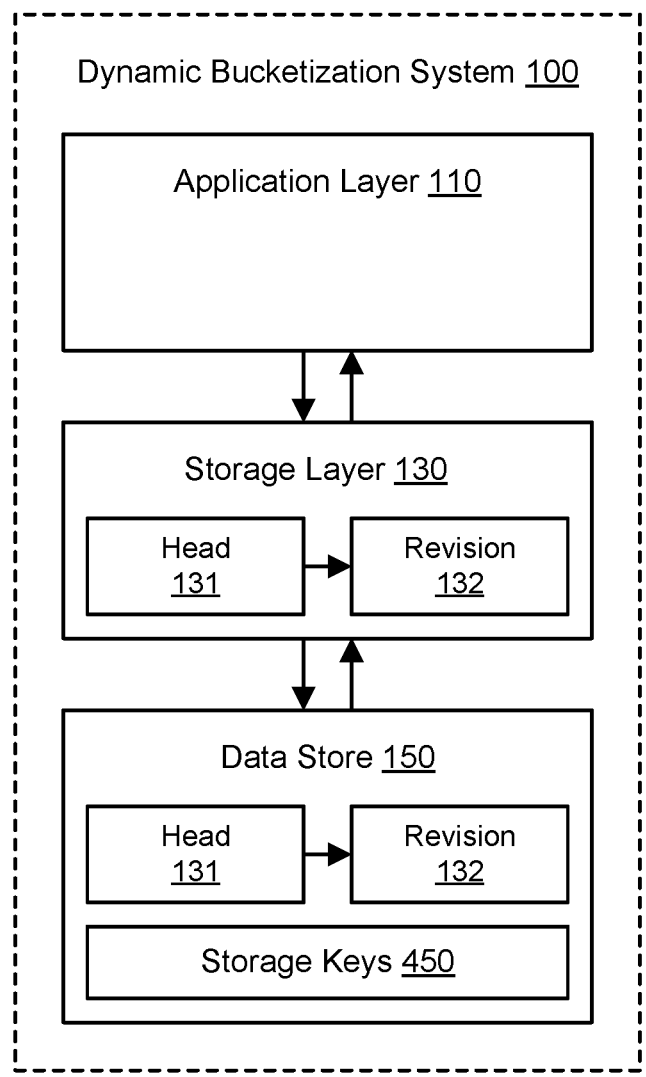
Figure 4D:
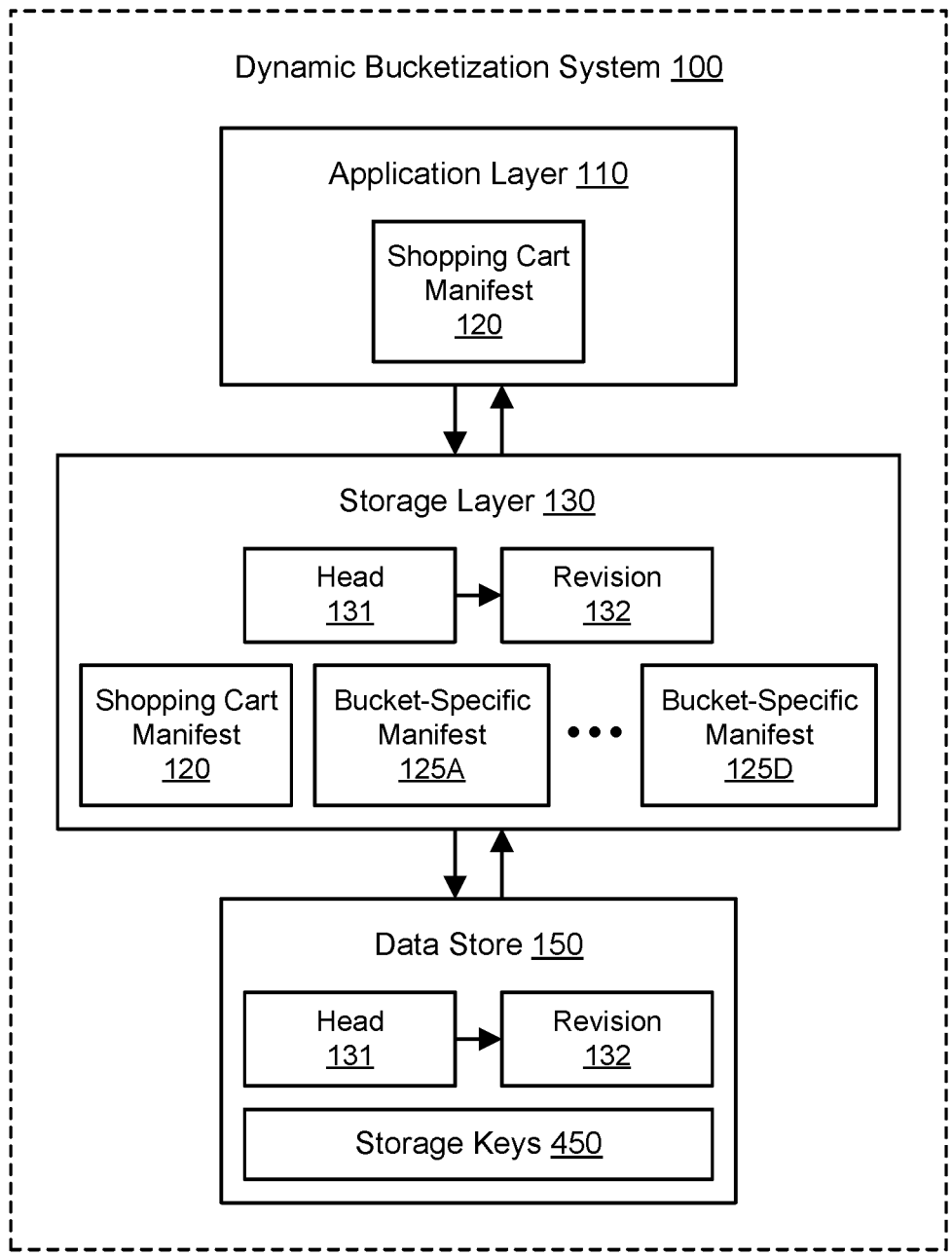

FIG. 4A, FIG. 4B, FIG. 4C, and FIG. 4D illustrate further aspects of the example system environment for dynamic bucketization based on real-time access patterns, including an example of loading a list of items to an application layer, according to some embodiments. As shown in FIG. 4A, when a request is received by the dynamic hydration system 100 to load a list of items associated with a particular user, the desired data (e.g., storage keys 450) may be stored in the data store 150. The request may indicate the number of items (e.g., the top 10 active items) and a sorting criterion such as AddedToCartDate. In the data store 150, a head data structure 131 may be stored for the list. The list may be versioned, and the head 131 may include a reference to the latest revision 132 of the list. The application layer 110 may invoke the storage layer 130 to load the manifest for the list. As shown in FIG. 4B, the storage layer 130 may first load the head data structure 131 from the data store 150. As shown in FIG. 4C, the storage layer 130 identifies the latest revision identifier in the head 131 and acquires that revision 132 from the data store 150. As shown in FIG. 4D, the storage layer 130 may use the revision 132 to load the manifest 120 from the data store 150. In some embodiments, only the page storing the manifest may be fetched. According to the bucket parameters, the storage layer 130 may create the bucket-specific manifests 125A-125D and sort the item IDs in those manifests using the sorting criterion. At the storage layer 130, the manifests 125A-125D may include an additional attribute per row of a storage key. The complete manifest 120 may be provided to the application layer 110. The application layer 110 may filter out the desired active items, find the top 10 active items plus some bucket-specific buffer value (e.g., 2), and send the list of twelve item IDs to the storage layer for a load operation.

FIG. 5 illustrates further aspects of the example system environment for dynamic bucketization based on real-time access patterns, including an example of a bucket-specific manifest comprising a sorted list of items divided into a plurality of access windows, according to some embodiments. A bucket-specific manifest 125A may include, for a list of item IDs in a particular bucket, data such as the corresponding product IDs, a data at which the item was added to the list, and a storage key in the data store 150. As shown in the example of FIG. 5, items 1-10 in a first access window may be stored using one page or record identified by storage key 151, items 11-20 in a second access window may be stored using one page or record identified by storage key 152, items 21-30 in a third access window may be stored using one page or record identified by storage key 153, and items 31-38 in a fourth access window may be stored using one page or record identified by storage key 154. As discussed above with respect to FIG. 4D, the application layer 110 may send the list of twelve item IDs to the storage layer for a load operation. The manifest indicates that the desired twelve item IDs are located in two different storage keys 151 and 152.

Turning back to FIG. 1, the storage layer may load all the items 1-10 from storage key 151 and all the items 11-20 from storage key 152, store items 1-20, and provide the requested items 1-12 to the application layer 110 for hydration. If any of items 1-10 is modified at the application layer 110, then the storage layer 130 may store all of the items 1-10 in that access window back to the data store 150 at storage key 151. Similarly, if any of items 11 or 12 is modified at the application layer 110, then the storage layer 130 may store all of the items 11-12 in that access window back to the data store 150 at storage key 152.

Figure 6:
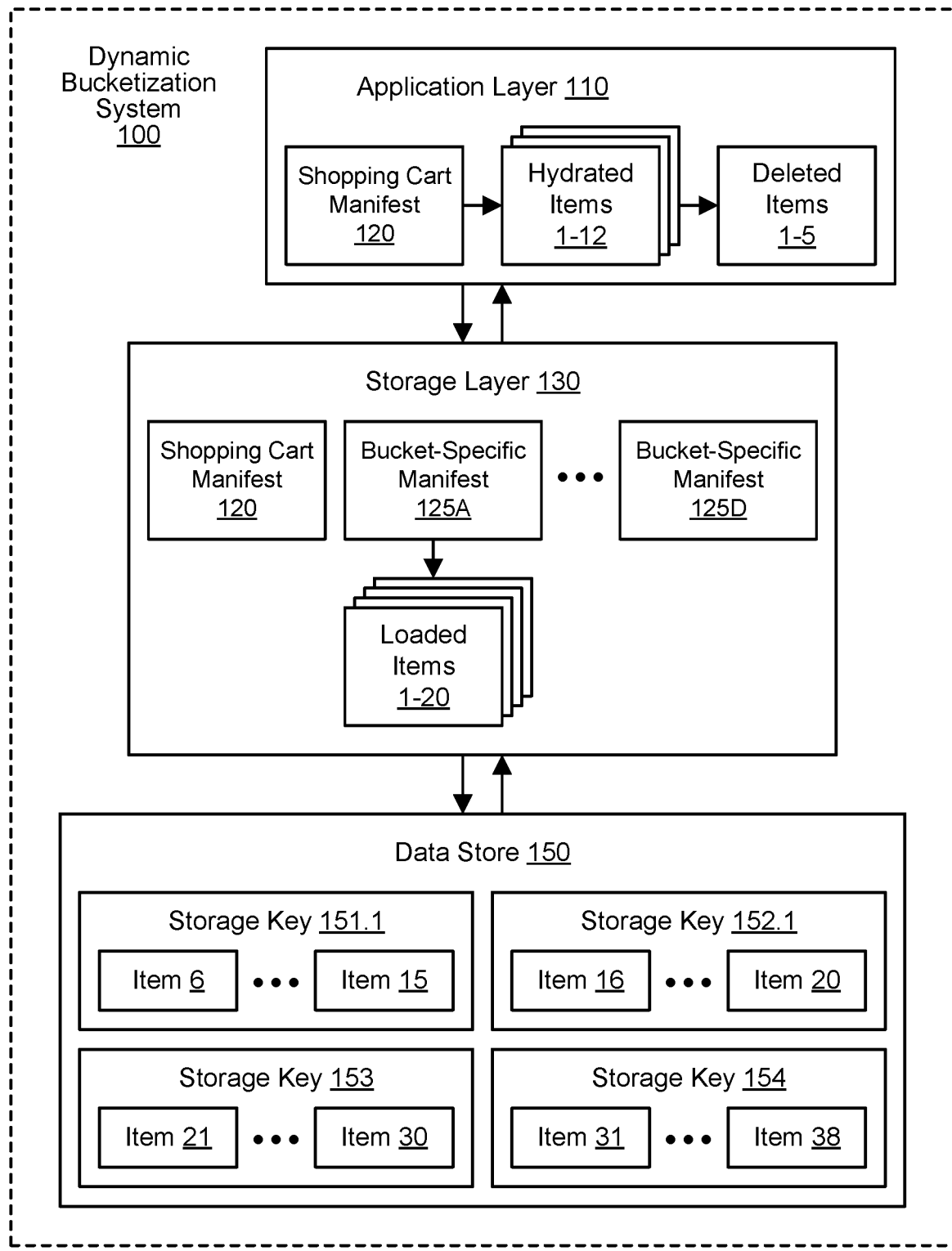
FIG. 6 illustrates further aspects of the example system environment for dynamic bucketization based on real-time access patterns, including an example of item deletion, according to some embodiments.

FIG. 6 illustrates further aspects of the example system environment for dynamic bucketization based on real-time access patterns, including an example of item deletion, according to some embodiments. In the example of FIG. 6, one or more operations at the application layer 110 may result in deletion of item 1 through item 5. To maintain the same page size (10 items) for the first storage key, items may be borrowed from the next storage key. As a result of this redistribution of item identifiers, the first storage key 151 may include items 6-15, while the second storage key 152 may be reduced to items 16-20. The storage layer 130 may pass these updated lists of items back to the data store 150 for updating in storage key 151.1 and storage key 152.1.

Figure 7:
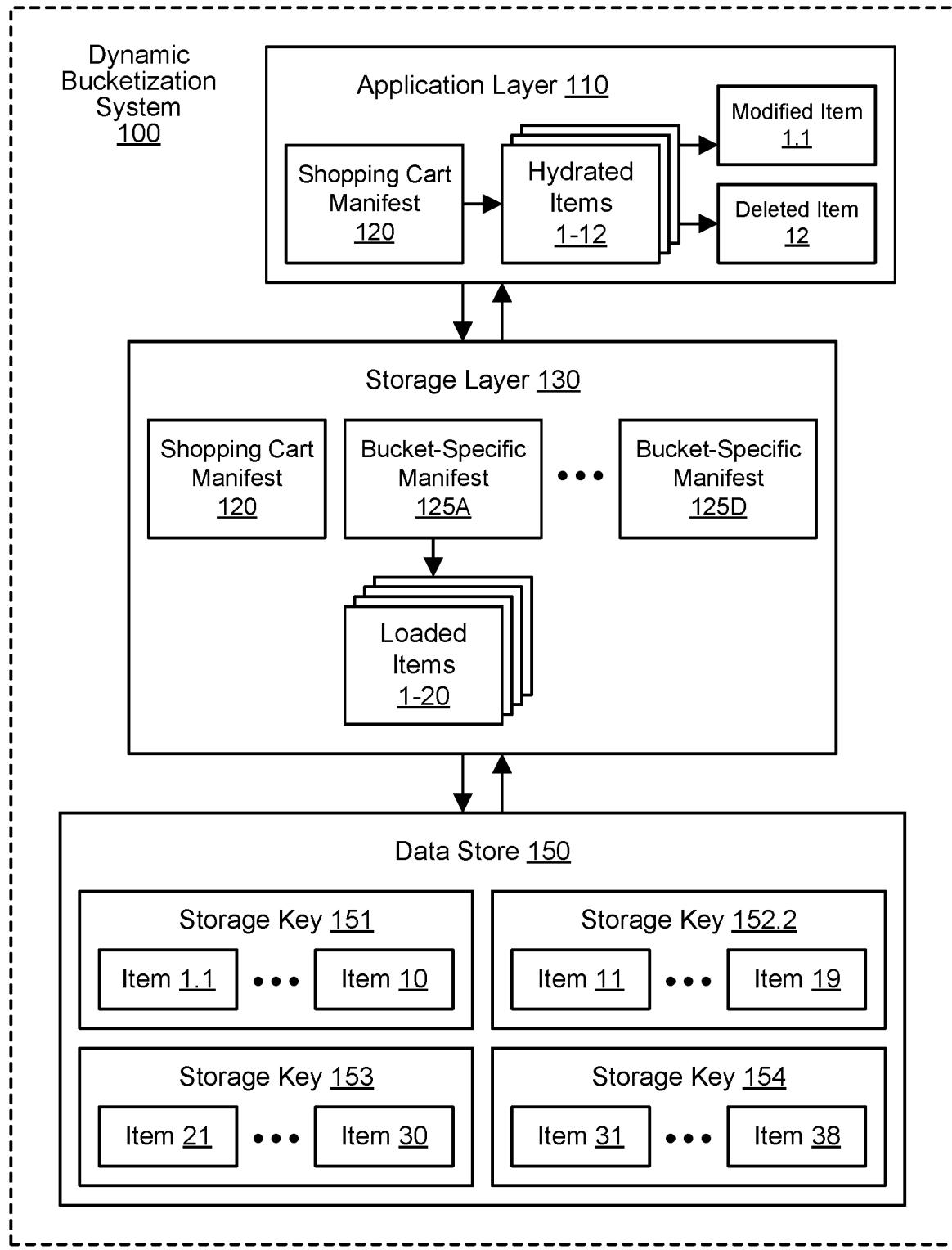
FIG. 7 illustrates further aspects of the example system environment for dynamic bucketization based on real-time access patterns, including an example of item modification and item deletion, according to some embodiments.

FIG. 7 illustrates further aspects of the example system environment for dynamic bucketization based on real-time access patterns, including an example of item modification and item deletion, according to some embodiments. In the example of FIG. 7, one or more operations at the application layer 110 may result in modification of item 1 and deletion of item 20. In such a scenario, both the first and second access windows are changed. In one embodiment, the storage layer 130 may pass updated items back to the data store 150 for updating in both storage key 151 (now including modified item 1.1 through item 10) and storage key 152.2 (with items 11 through 19). If a client then asks to load the second page of ten items, the storage layer 130 may load both storage key 152.2 and storage key 153.

Illustrative Computer System

In at least some embodiments, a computer system that implements a portion or all of one or more of the technologies described herein may include a general-purpose computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method, comprising:
    performing, by one or more computing devices comprising one or more respective processors and memory implementing a dynamic bucketization system:
        distributing, by the dynamic bucketization system, a plurality of item identifiers for a plurality of items, stored in a data store, among a plurality of buckets associated with a user identifier, said distributing based at least in part on one or more bucket parameters, wherein said distributing comprises:
            assigning a first portion of the item identifiers to a first bucket of the plurality of buckets, and
            assigning a second portion of the item identifiers to a second bucket of the plurality of buckets;
        dividing, by the dynamic bucketization system, the item identifiers into a plurality of access windows within the buckets associated with the user identifier, wherein said dividing comprises dividing the first portion of the item identifiers of the first bucket into a first set of two or more of the access windows including a first access window that stores a first list of the item identifiers of the first portion, and a second access window that stores a second list of the item identifiers of the first portion such that item identifiers for items to be accessed together are listed together in respective ones of the first set of access windows;
        responsive to an access request, associated with the user identifier, for one or more of the items, selectively hydrating items in the first access window of the first set of access windows of the first bucket without hydrating items in one or more other access windows of the first bucket, comprising:
            determining, based on identifying the first list as including the one or more items of the access request, to hydrate load the items of the first list of the item identifiers in the first access window of the first bucket without hydrating items in one or more other access windows of the first bucket, wherein hydrate comprises load the items from the first list of the item identifiers, and hydrating, by the dynamic bucketization system from the data store over a network into another data store as hydrated items, all of the items corresponding to the first list of the item identifiers, wherein hydrating comprises loading all of the items corresponding to the first list of the item identifiers in the first access window of the first bucket; and subsequent to said selectively hydrating, moving, by the dynamic bucketization system, one or more of the item identifiers between the first access window from which all of the items corresponding to the first list of the item identifiers were hydrated and the second access window based at least in part on one or more access requests subsequent to the access request and with respect to the hydrated items, wherein said moving one or more of the item identifiers based at least in part on one or more access requests reduces fragmentation in the data store; and storing, in the data store, an updated plurality of items corresponding to the item identifiers in the first access window and an updated plurality of items corresponding to the item identifiers in the second access window.

2. The method as recited in claim 1, wherein the updated plurality of items corresponding to the item identifiers in the first access window is stored using a first storage record in the data store, and wherein the updated plurality of items corresponding to the item identifiers in the second access window is stored using a second storage record in the data store.

3. The method as recited in claim 1, wherein the item identifiers are divided into the plurality of access windows within the buckets based at least in part on one or more access window parameters associated with the buckets, wherein the one or more access window parameters comprise an access window size.

4. The method as recited in claim 1, wherein the item identifiers are sorted and divided into the plurality of access windows within the buckets based at least in part on one or more access window parameters associated with the buckets, wherein the one or more access window parameters comprise one or more sorting criteria.

5. The method as recited in claim 1, wherein a request from a client to load the items as hydrated items comprises a request to load one or more items from the first access window and one or more items from the second access window, wherein the hydrated items comprise a plurality of items corresponding to the second list of the item identifiers in the second access window of the first bucket.

6. The method as recited in claim 1, wherein the one or more access requests subsequent to the access request comprise one or more requests to delete one or more of the items from the first access window, wherein one or more item identifiers are redistributed from the second access window to the first access window to maintain a same size of the first access window.

7. The method as recited in claim 1, wherein a request from a client to load the items as hydrated items comprises a request to load a particular number of items, wherein a number of items representing the particular number plus a buffer value are loaded from the first access window and the second access window of the first bucket, and wherein the number of items is larger than the first list of the item identifiers.

8. The method as recited in claim 1, wherein the plurality of item identifiers are associated with a shopping cart for an Internet-accessible catalogue.

9. The method as recited in claim 1, further comprising:
based at least in part on the one or more access requests subsequent to the access request with respect to the hydrated items, combining the first access window and the second access window into a new access window comprising the first list of the item identifiers and the second list of the item identifiers.

10. One or more non-transitory computer-readable storage media storing program instructions of a dynamic bucketization system that, when executed on or across one or more processors, perform:

distributing a plurality of item identifiers for a plurality of items, stored in a data store, among a plurality of buckets associated with a user identifier, said distributing based at least in part on one or more bucket parameters, wherein said distributing comprises:

assigning a first portion of the item identifiers to a first bucket of the plurality of buckets, and assigning a second portion of the item identifiers to a second bucket of the plurality of buckets;

dividing the item identifiers into a plurality of access windows within the buckets associated with the user identifier, wherein said dividing comprises dividing the first portion of the item identifiers of the first bucket into a first set of two or more of the access windows including a first access window that stores a first list of the item identifiers of the first portion, and a second access window that stores a second list of the item identifiers of the first portion such that the item identifiers for items to be accessed together are listed together in respective ones of the first set of access windows;

responsive to an access request, associated with the user identifier, for one or more of the items, selectively hydrating items in the first access window of the first set of access windows of the first bucket without hydrating items in one or more other access windows of the first bucket, comprising:

determining, based on identifying the first list as including the one or more items of the access request, to hydrate the items the first list of the item identifiers in the first access window of the first bucket without hydrating items in one or more other access windows of the first bucket, wherein hydrate comprises load the items from the first list of the item identifiers, and hydrating, from the data store over a network into another data store as hydrated items, all of the items corresponding to the first list of the item identifiers, wherein hydrating comprises loading all of the items corresponding to the first list of the item identifiers in the first access window of the first bucket; and subsequent to said selectively hydrating, moving one or more of the item identifiers between the first access window from which all of the items corresponding to the first list of the item identifiers were hydrated and the second access window based at least in part on one or more access requests subsequent to the access request and with respect to the hydrated items, wherein said moving one or more of the item identifiers based at least in part on one or more access requests reduces fragmentation in the data store; and storing, in the data store, an updated plurality of items corresponding to the item identifiers in the first access window and an updated plurality of items corresponding to the item identifiers in the second access window.

11. The one or more non-transitory computer-readable storage media as recited in claim 10, wherein the updated plurality of items corresponding to the item identifiers in the first access window is stored using a first storage record in the data store, and wherein the updated plurality of items corresponding to the item identifiers in the second access window is stored using a second storage record in the data store.

12. The one or more non-transitory computer-readable storage media as recited in claim 10, wherein the program instructions of the dynamic bucketization system, when executed on or across one or more processors, further perform:

based at least in part on the one or more access requests with respect to the hydrated items, combining the first access window and the second access window into a new access window comprising the first list of the item identifiers and the second list of the item identifiers.

13. The one or more non-transitory computer-readable storage media as recited in claim 10, wherein a request from a client to load the items as hydrated items comprises a request to load a particular number of items, wherein a number of items representing the particular number plus a buffer value are loaded from the first access window and the second access window of the first bucket, and wherein the number of items is larger than the first list of the item identifiers.

14. The one or more non-transitory computer-readable storage media as recited in claim 10, wherein the item identifiers are divided into the plurality of access windows within the buckets based at least in part on one or more access window parameters associated with the buckets, wherein the one or more access window parameters comprise an access window size, wherein the access window size corresponds to a page size of the data store.

15. The one or more non-transitory computer-readable storage media as recited in claim 10, wherein the item identifiers are divided into the plurality of access windows within the buckets based at least in part on one or more access window parameters associated with the buckets, wherein the one or more access window parameters comprise one or more sorting criteria.

16. The one or more non-transitory computer-readable storage media as recited in claim 10, wherein the plurality of item identifiers are associated with a shopping cart for an Internet-accessible catalogue.

17. A system, comprising:

a dynamic bucketization system comprising one or more processors and one or more memories to store computer-executable instructions that, when executed, cause the one or more processors to:

distribute a plurality of item identifiers for a plurality of items, stored in a data store, among a plurality of buckets associated with a user identifier, said distribute based at least in part on one or more bucket parameters, wherein said distribute comprises:

assign a first portion of the item identifiers to a first bucket of the plurality of buckets, and wherein assign a second portion of the item identifiers to a second bucket of the plurality of buckets;

divide the item identifiers into a plurality of access windows within the buckets associated with the user identifier, wherein said divide comprises divide the first portion of the item identifiers of the first bucket into a first set of two or more of the access windows including a first access window that stores a first list of the item identifiers of the first portion, and a second access window that stores a second list of the item identifiers of the first portion such that item identifiers for items to be accessed together are listed together in respective ones of the first set of access windows;

responsive to an access request, associated with the user identifier, for one or more of the items, selectively hydrate items in the first access window of the first set of access windows of the first bucket without hydrating items in one or more other access windows of the first bucket, comprising:

determine, based on identifying the first list as including the one or more items of the access request, to hydrate the items of the first list of the item identifiers in the first access window of the first bucket without hydrating items in one or more other access windows of the first bucket, wherein hydrate comprises load the items from the first list of the item identifiers, and hydrate, from the data store over a network into another data store as hydrated items, a plurality of hydrated items, all of the items corresponding to the first list of the item identifiers, wherein hydrate comprises load all of the items corresponding to the first list of the item identifiers in the first access window of the first bucket; and subsequent to said selectively hydrate, move one or more of the item identifiers between the first access window from which all of the items corresponding to the first list of the item identifiers were hydrated and the second access window based at least in part on one or more access requests subsequent to the access request and with respect to the hydrated items, wherein said moving one or more of the item identifiers based at least in part on one or more access requests reduces fragmentation in the data store, and wherein an updated plurality of items corresponding to the item identifiers in the first access window and an updated plurality of items corresponding to the item identifiers in the second access window are stored in the data store.

18. The system as recited in claim 17, wherein the item identifiers are divided into the plurality of access windows within the buckets based at least in part on one or more access window parameters associated with the buckets, wherein the one or more access window parameters comprise an access window size associated with a record size in the data store.

19. The system as recited in claim 17, wherein the item identifiers are divided into the plurality of access windows within the buckets based at least in part on one or more access window parameters associated with the buckets, wherein the one or more access window parameters comprise one or more sorting criteria.

20. The system as recited in claim 17, wherein the one or more access requests comprise one or more requests to delete one or more of the items from the first access window, wherein one or more item identifiers are redistributed from the second access window to the first access window to maintain a same size of the first access window.

* * * * *